US009940418B2

(12) United States Patent
Jallepalli et al.

(10) Patent No.: US 9,940,418 B2
(45) Date of Patent: Apr. 10, 2018

(54) SIMULATION OF HIERARCHICAL CIRCUIT ELEMENT ARRAYS

(71) Applicant: Freescale Semiconductor, Inc., Austin, TX (US)

(72) Inventors: Srinivas Jallepalli, Austin, TX (US); Jon S. Choy, Austin, TX (US)

(73) Assignee: NXP USA, Inc., Austin, TX (US)

( * ) Notice: Subject to any disclaimer, the term of this patent is extended or adjusted under 35 U.S.C. 154(b) by 336 days.

(21) Appl. No.: 14/806,566

(22) Filed: Jul. 22, 2015

(65) Prior Publication Data
US 2017/0024502 A1 Jan. 26, 2017

(51) Int. Cl.
*G06F 17/50* (2006.01)

(52) U.S. Cl.
CPC ...... *G06F 17/5036* (2013.01); *G06F 17/5045* (2013.01); *G06F 2217/10* (2013.01)

(58) Field of Classification Search
CPC ............ G06F 17/5036; G06F 17/5045; G06F 2217/10
USPC ....................................................... 716/106
See application file for complete search history.

(56) References Cited

U.S. PATENT DOCUMENTS

| 6,009,252 A * | 12/1999 | Lipton ................ G06F 17/5022 716/112 |
| 7,324,363 B2 | 1/2008 | Kerns et al. |
| 8,799,840 B1 * | 8/2014 | e Silva ................ G06F 17/5031 716/106 |
| 2005/0257178 A1 * | 11/2005 | Daems ................ G06F 17/5045 716/51 |

OTHER PUBLICATIONS

Francis et al., "Statistical Methodology for Modeling Non-IID Memory Fails Events," 2014 15th International Symposium on Quality Electronic Design (ISQED), Santa Clara, CA, Mar. 2014, pp. 205-211.

* cited by examiner

*Primary Examiner* — Jack Chiang
*Assistant Examiner* — Brandon Bowers

(57) ABSTRACT

This disclosure describes a design tool that iteratively performs simulation sets on an integrated circuit design, each corresponding to a different hierarchical level with each of the simulation sets producing a different set of simulation results. Each of the simulation sets utilizes a different set of local parameter values that include extreme instance local parameter values based on the set of simulation results of a preceding simulation set. The design tool generates a set of hierarchically aggregated simulation results based upon the last set of simulation results and global parameters, and modifies the integrated circuit design based upon a yield estimation that is determined from comparing the set of hierarchically aggregated simulation results to specification requirements that correspond to the integrated circuit design.

15 Claims, 8 Drawing Sheets

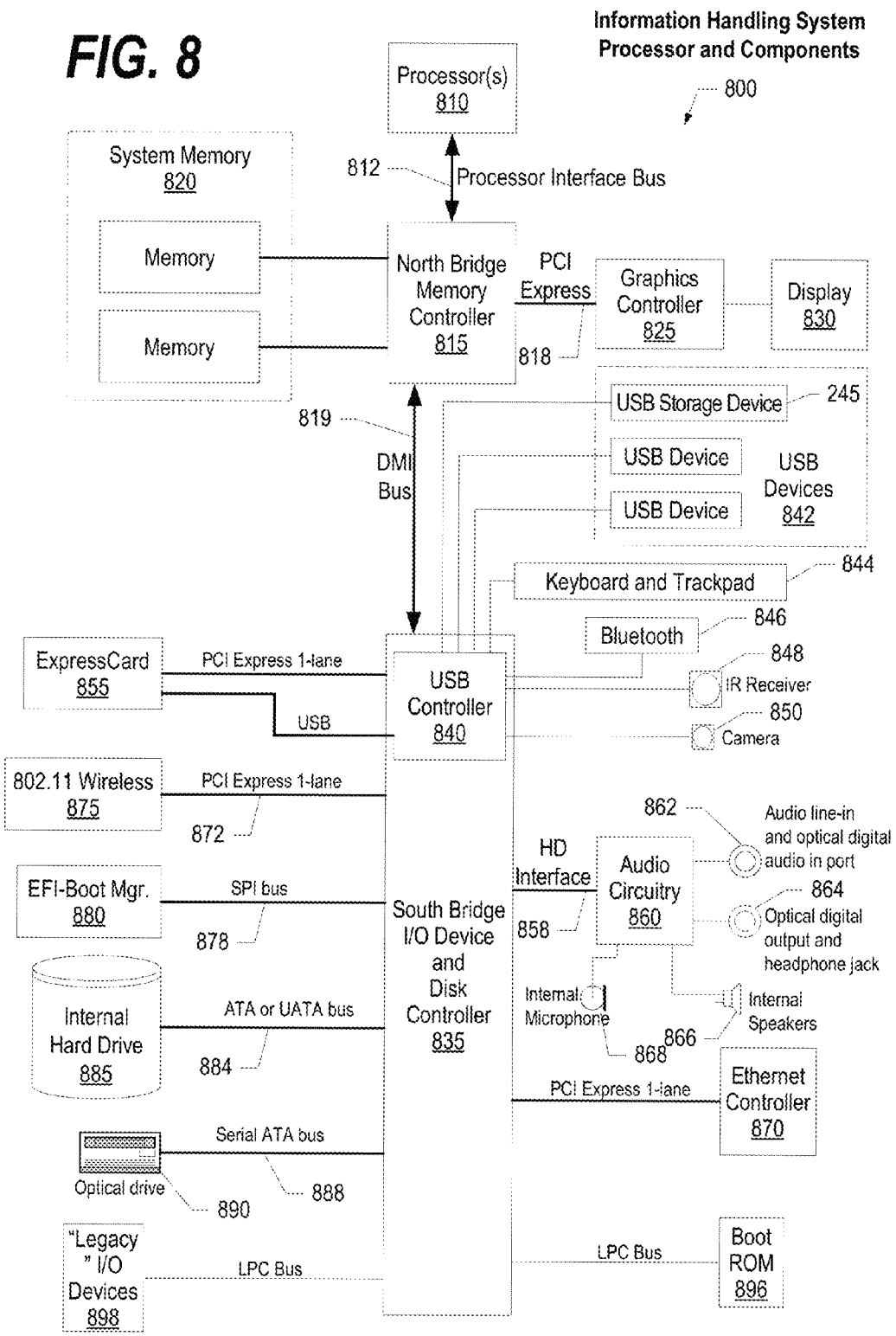

SIMULATION OF HIERARCHICAL CIRCUIT ELEMENT ARRAYS

TECHNICAL FIELD

The present disclosure relates to an efficient approach to accurately simulating integrated circuit designs having a hierarchical architecture.

BACKGROUND

Integrated circuit development involves the creation of electronic components, such as transistors, resistors, capacitors and the metallic interconnect of these components onto a piece of a semiconductor, such as silicon. A typical standard cell based integrated circuit design cycle involves multiple stages such as system specification, architectural design, functional/logic design, timing analysis, physical design, timing optimization, and fabrication. During the timing analysis and timing optimization stages, statistical SPICE (Simulation Program with Integrated Circuit Emphasis) simulations are typically utilized to assess an integrated circuit's performance and estimated production yield.

Although statistical simulations are often burdensome for large integrated circuit designs, they are virtually intractable for large hierarchical circuit element arrays, such as memory arrays. In large hierarchical circuit element arrays, multiplicity varies greatly among transistors in different blocks. For example, a memory array may include 128 bitcells per sense amplifier, 64 sense amplifiers per control logic block, and 128 control logic blocks. In effect, the memory array includes 128*64*128=1,048,576 bitcells, 128*64=8,192 sense amplifiers, and 128 control logic blocks. The larger the number of copies of a transistor, the farther simulations are likely to reach into the distribution tails of the local, or the random, instance-specific transistor parameters.

To obtain reliable visibility to the distribution tails, a developer requires many millions of simulations of the very large memory arrays. Even a single simulation of the complete array can take several days. As such, the developer may simulate only a critical path in an array. However, selectively skewing transistors in different blocks by different amounts in a statistically accurate manner is not trivial. As such, designers typically skew devices in the different blocks to their individually extreme values to err on the side of safety. Such an approach, however, results in a less competitive design and does not enable designers to assess the robustness of third party IP, which may not have been designed to such pessimistic constraints.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 8 is a block diagram of a data processing system in which the methods described herein can be implemented.

DETAILED DESCRIPTION

A design tool is provided that generates hierarchically aggregated simulation results of a hierarchical design by analyzing each of the hierarchical levels of a circuit design on an individual basis and promoting extreme instance local parameter values from lower hierarchical levels to higher hierarchical level simulations. As a result, the design tool achieves an accurate assessment of integrated circuit production yield in a substantially reduced number of simulations.

The design tool determines a critical path of the integrated circuit and defines a series of hierarchies such that a set of the elements of the critical path are duplicated in any given hierarchy. Beginning at the lowest hierarchical level, the design tool performs Monte Carlo simulations and varies the lowest hierarchical level's local parameter values. The design tool computes extreme value probability distribution functions (PDFs) of the integrated circuit based upon the critical path simulation results and the number of instances, such as the number of bitcell instances, in the lowest level of the array.

The design tool then determines extreme instance local parameter values that generate output values on the extreme value PDFs. The design tool promotes the lowest hierarchical level's extreme instance local parameter values to the next hierarchical level, and uses the extreme instance local parameter values and the next hierarchical level's original local parameter distributions in the next set of Monte Carlo simulations. This promotion of extreme instance local parameter values based upon one hierarchical level's simulation to the next hierarchical level's simulation continues until the design tool is finished with the top hierarchical level's simulations.

The design tool then performs a last set of Monte Carlo simulations using the top hierarchical level's extreme instance local parameter values along with global parameters to generate two sets of hierarchically aggregated simulation results corresponding to extremes at the left tail and the right tail of the critical path probability distribution function. The design tool then compares the hierarchically aggregated simulation results with specification requirements for a metric of the integrated circuit design, such as supply current, to determine whether the integrated circuit design when fabricated will meet production yield requirements.

Figure 1:
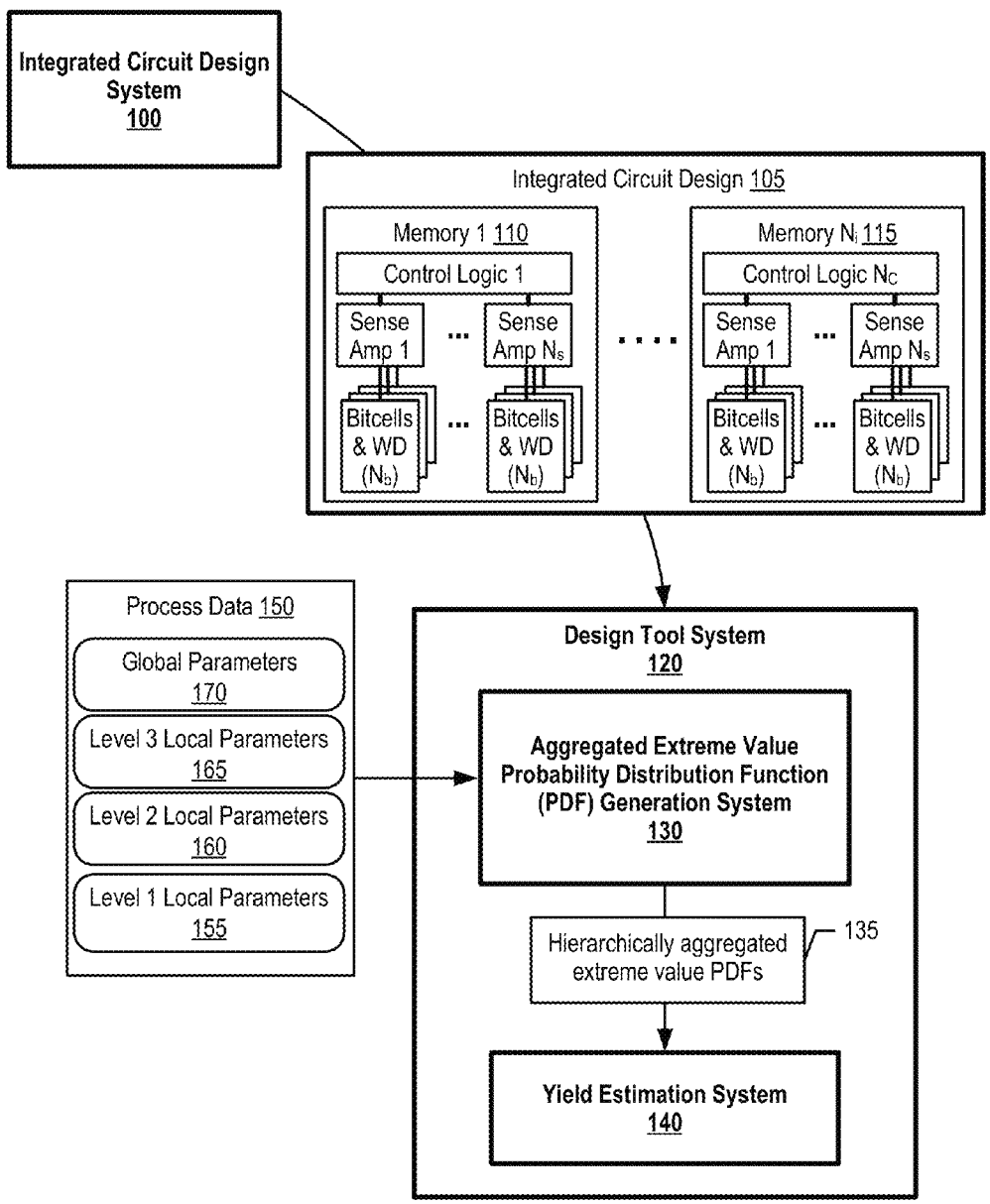
FIG. 1 is a diagram depicting one example of a design tool system that iteratively aggregates simulation results up through hierarchical levels of an integrated circuit design to determine whether the integrated circuit design meets production yield requirements.

FIG. 1 is a diagram depicting one example of a design tool system that iteratively aggregates simulation results up through hierarchical levels of an integrated circuit design to determine whether the integrated circuit design meets production yield requirements.

A circuit designer uses integrated circuit design system 100, such as information handling system 800 shown in FIG. 8, to create integrated circuit design 105. Integrated circuit design 105 has a hierarchical architecture, with memory instance 1 110 through memory instance Ni 115 having a similar internal hierarchical structure. Each memory instance includes a control logic instance, multiple sense amplifier instances, multiple bitcell instances and, in one embodiment, multiple word-line driver instances. Integrated circuit design 105 may be a memory array that includes 128 control logic instances, 64 sense amplifier instances per control logic instance, 128 bitcell and word-line driver instances per sense amplifier instances. In this embodiment, integrated circuit design 105 includes 128*64*128=1,048, 576 bitcell instances, 128*128=16384 word-line driver instances, 128*64=8,192 sense amplifier instances, and 128 control logic instances. Embodiments of the present disclosure address all hierarchical types of circuit design, and are not limited to a specific circuit type such as a memory array.

Design tool system 120 may be an information handling system, such as that shown in FIG. 8, and includes aggregated extreme value PDF generation system 130. Aggregated extreme value PDF generation system 130 determines integrated circuit design 105's critical path, which includes one bitcell, one word-line driver, one sense amplifier, and one control logic block. Aggregated extreme value PDF generation system 130 then simulates the critical path and varies level 1 local parameters 155, such as those corresponding to bitcells, from process data 150. The simulations produce a critical path PDF, which aggregated extreme value PDF generation system 130 uses to generate first level extreme value PDFs based upon the number of level 1 instances discussed below. In turn, aggregated extreme value PDF generation system 130 determines local parameter values of the bitcell that produce outputs corresponding to the extreme value PDFs, referred to herein as extreme instance local parameter values.

Aggregated extreme value PDF generation system 130 promotes the extreme instance local parameter values from the bitcell level up to level 2 simulations and varies level 2 local parameters, such as those corresponding to sense amplifiers, of all elements that have more than one instance 160 to generate a second critical path PDF. Aggregated extreme value PDF generation system 130, in turn, generates second level "aggregated" extreme value PDFs based upon the number of level 2 instances and determines extreme instance local parameter values of the bitcell and the sense amplifier that produce outputs corresponding to the aggregated extreme value PDFs.

Aggregated extreme value PDF generation system 130 promotes the extreme instance local parameter values from level 2 up to level 3 simulations and varies level 3 local parameters, such as those corresponding to control logic, of all elements that have more than one instance 165 to generate a third critical path PDF. Aggregated extreme value PDF generation system 130, in turn, generates third level aggregated extreme value PDFs based upon the number of level 3 instances and determines extreme instance local parameter values of the bitcell, the word-line driver, the sense amplifier, and the control logic that produce outputs corresponding to the newly generated aggregated extreme value PDFs.

Aggregated extreme value PDF generation system 130 then uses distributions of the extreme instance local parameter values of the bitcell, the word-line driver, the sense amplifier, and the control logic while varying global parameters 170 to generate two distributions, in one embodiment, of hierarchically aggregated simulation results, referred to as hierarchically aggregated extreme value PDFs 135. A first set of simulations use global parameters 170 and the left tail's extreme instance local parameter value distributions. The second set of simulations use global parameters 170 and the right tail's extreme instance local parameter value distributions.

Yield estimation system 140 compares the two hierarchically aggregated extreme value PDFs 135 obtained for each global parameter to a specification requirement, such as supply current, to estimate the yield of the integrated circuit design. When the distributions of the extreme values meet the yield requirement, yield estimation system 140 generates a notification and design tool system 120 proceeds to the next stage in the integrated circuit development process, such as layout or mask generation.

However, when the extreme values distributions do not meet the yield requirement, yield estimation system 140 generates a notification that modifications are required to integrated circuit design 105, such as increasing driver strength of buffers along the critical path. In one embodiment, integrated circuit design system 100 is integrated into design tool system 120.

Figure 2:
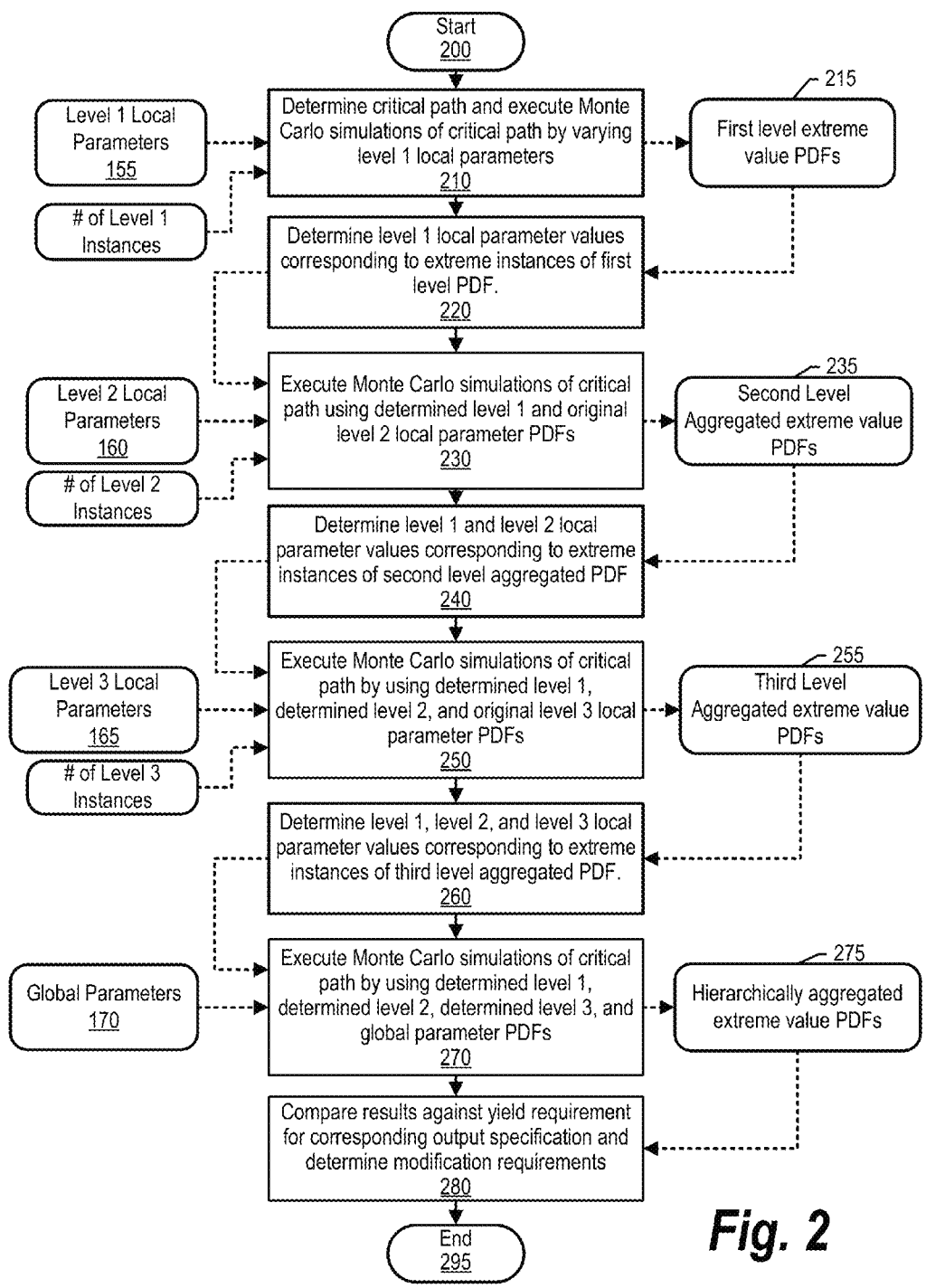
FIG. 2 is a high-level flowchart depicting one example of steps taken to hierarchically aggregate simulation results from an integrated circuit design that is designed with multiple hierarchical levels.

FIG. 2 is a high-level flowchart depicting one example of steps taken to hierarchically aggregate simulation results from an integrated circuit design that is designed with multiple hierarchical levels. FIG. 2 provides a high-level overview flow of the iterative aggregation approach to determine and utilize extreme instance local parameter values from lower level hierarchical levels into higher hierarchical level simulations.

Figure 3:
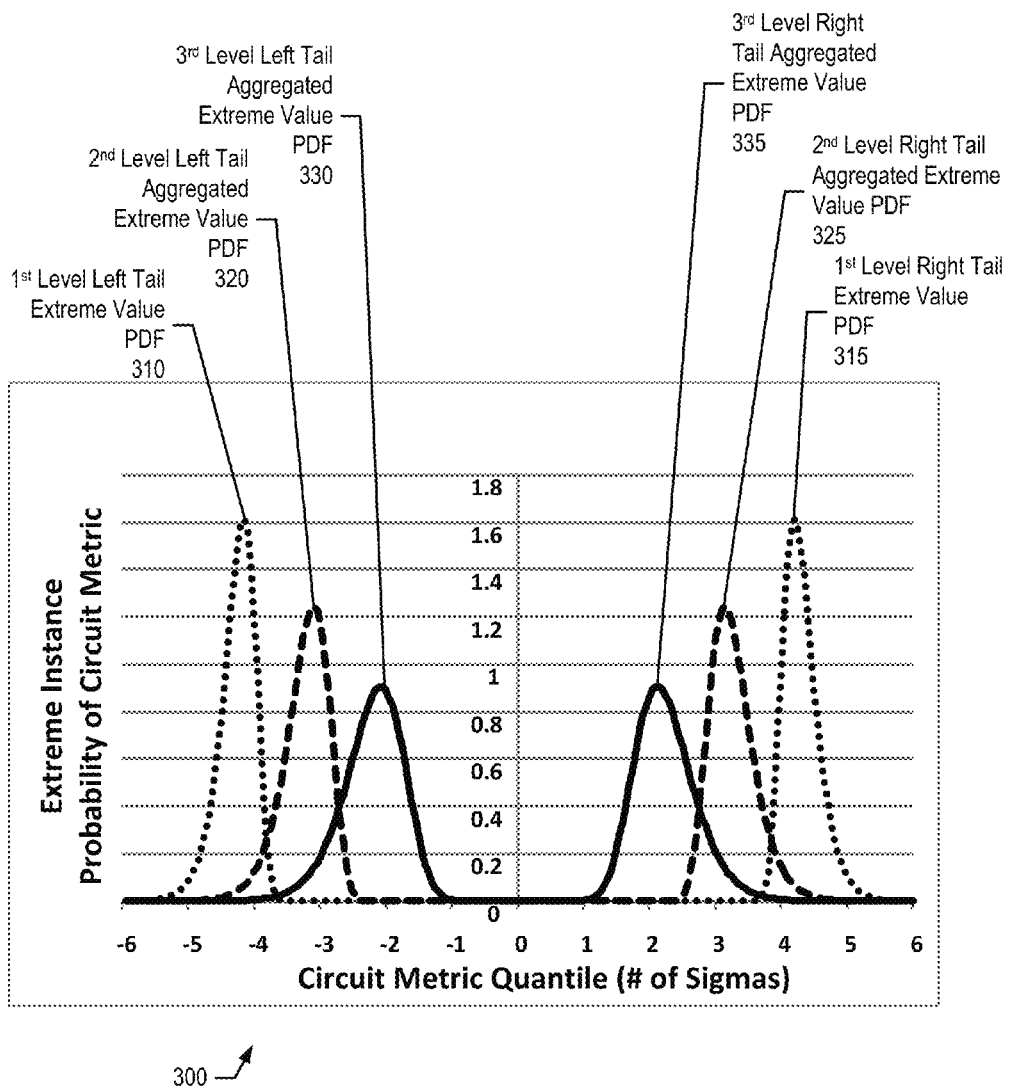
FIG. 3 is a diagram depicting a graphical example of aggregated extreme value probability distribution functions at various hierarchical levels.

FIG. 2 processing commences at 200 whereupon, at 210, the process determines a critical path in the integrated circuit design based upon, for example, prior timing analysis, and defines a series of hierarchies such that a set of the elements of the critical path are duplicated in any given hierarchy. The process then executes Monte Carlo simulations of the critical path by varying level 1 local parameters 155. In one example, the critical path includes one instance from each hierarchical level, such as one bitcell instance, one word-line driver instance, one sense amplifier instance, and one control logic instance. At 210, in one embodiment, the process performs N number of simulations, such as 1,000 simulations, to generate a critical path PDF, which the process then utilizes in conjunction with the number of level 1 instances to create two first level extreme value PDFs 215, one for each tail of the critical path PDF. See FIG. 7 and corresponding text for further details. Examples of the two extreme value PDFs are shown in FIG. 3, reference numerals 310 and 315.

At 220, the process determines the level 1 extreme instance local parameter values corresponding to the output values that generated first level extreme value PDFs 215. At 230, the process moves up one hierarchical level in the integrated circuit design and executes Monte Carlo simulations of the critical path using the level 1 extreme instance local parameter values determined in 220, varying the local parameters of all elements that have more than one instance, while also varying level 2 local parameters 160. The Monte Carlo simulation results create another critical path PDF, which the process then utilizes in conjunction with the number of level 2 instances to create two second level aggregated extreme value PDFs 235. Examples of both of the second level aggregated extreme value PDFs are shown in FIG. 3, reference numerals 320 and 325.

At 240, the process determines the level 1 and level 2 local parameter values corresponding to the output values that generated second level aggregated extreme value PDFs 235. At 250, the process executes Monte Carlo simulations of the critical path by using the determined level 1 and level 2 extreme instance local parameter values from 240, and original level 3 local parameters 165. The simulations result in another critical path PDF, which the process then utilizes in conjunction with the number of level 3 instances to create two third level aggregated extreme value PDFs 255. Examples of both of the third level aggregated extreme value PDFs are shown in FIG. 3, reference numerals 330 and 335.

At 260, the process determines level 1, level 2, and level 3 local parameter values corresponding to the output values that generated third level aggregated extreme value PDFs 255. At this point, the process is at the integrated circuit design's highest hierarchical level but still requires evaluation on a global production level.

As such, at 270, the process executes Monte Carlo simulations of the critical path by using the determined level 1, level 2, and level 3 extreme instance local parameter values from 260, and varies global parameters 170. The process performs two sets of simulations at 270 to generate distributions of hierarchically aggregated simulation results. The first set of simulations uses the extreme instance local parameter values corresponding to the left tail extreme value PDF from 260 and varies the global parameters. The second set of simulations uses the extreme instance local parameter values corresponding to the right tail extreme value PDF from 260 and varies the global parameters.

At 280, the process compares hierarchically aggregated extreme value PDFs 275 obtained for each global parameter against a corresponding specification requirement, such as a requirement that input current be less than 2 mA, to determine the acceptability of parts simulated using Monte Carlo. In one embodiment, the process informs a circuit designer of yield estimation shortfall and the circuit designer modifies the integrated circuit design accordingly. FIG. 2 processing thereafter ends at 295.

FIG. 3 is a diagram depicting a graphical example of aggregated extreme value PDFs generated at various hierarchical levels for an example memory array circuit. Graph 300 shows extreme value PDFs generated from the bitcell and word-line driver level simulations, which are first level left tail extreme value PDF 310 and first level right tail extreme value PDF 315. The design tool determines extreme instance local parameter values of the bitcell that produced outputs for the extreme value PDFs and promotes the identified parameter values up to second hierarchical level simulations.

The design tool generates second level left tail aggregated extreme value PDF 320 and second level right tail aggregated extreme value PDF 325 based upon simulation results from simulating the second hierarchical level. The design tool determines extreme instance local parameter values of the bitcell and sense amplifier that produced outputs for the extreme value PDFs 320 and 325, and promotes the identified local parameter values up to third hierarchical level simulations.

The design tool generates third level left tail aggregated extreme value PDF 330 and third level right tail aggregated extreme value PDF 335 based upon results generated by simulating the third hierarchical level. The design tool determines extreme instance local parameter values of the bitcell, word-line driver, sense amplifier and control logic that produced outputs for the aggregated extreme value PDFs 330 and 335. Due to the approach discussed herein to promote extreme instance local parameter values up hierarchical levels for simulations, the aggregated extreme value PDFs shown in graph 300 are shifted towards the median and, in turn, require less stringent design requirements because they do not require worst case scenarios for every hierarchical level all at once.

Figure 7:
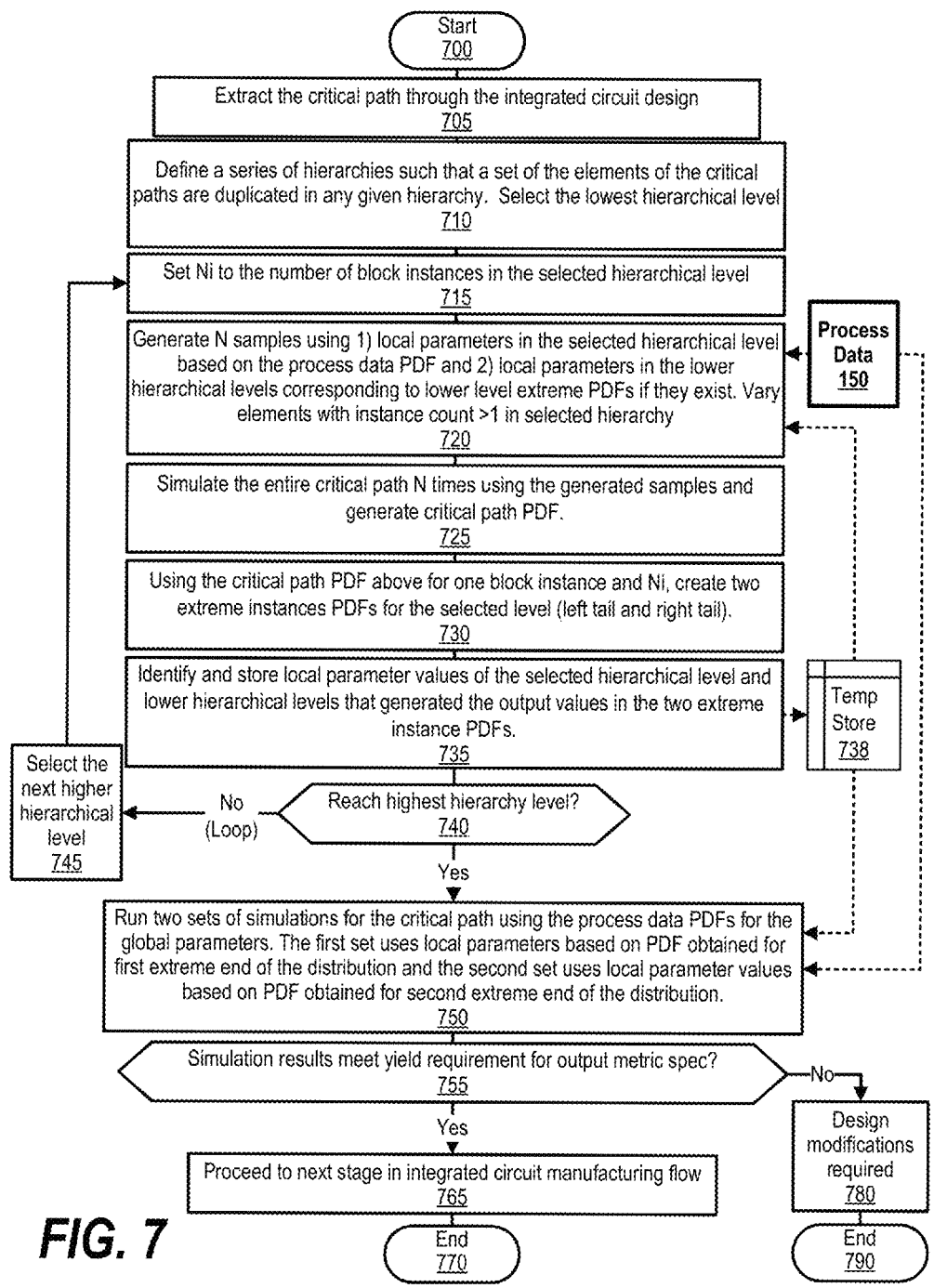
FIG. 7 is a flowchart depicting one example of steps taken to generate an aggregated probability distribution function and use the aggregated probability distribution function to determine whether an integrated circuit design meets a yield requirement.

The design tool uses the extreme instance local parameter values with global parameter values to generate two sets of hierarchically aggregated extreme value PDFs, which are eventually compared against a specification requirements for each generated global parameter value determine a yield estimation of a fabrication of the integrated circuit design (see FIG. 7 and corresponding text for further details).

Figure 4:
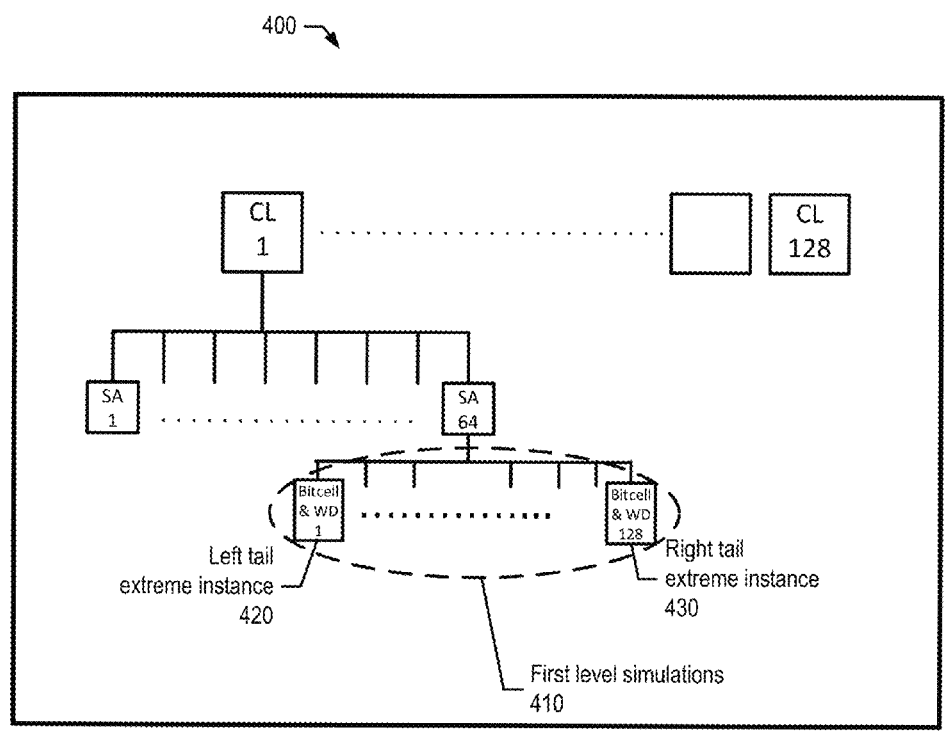
FIG. 4 is a diagram depicting a graphical example of the integrated circuit design simulation hierarchy subsequent to simulating the bitcell hierarchical level.

FIG. 4 is a diagram depicting a graphical example of the integrated circuit design simulation hierarchy subsequent to simulating the bitcell hierarchical level. Diagram 400 shows that after performing first level simulations 410 of the critical path and varying the local parameter values of the bitcell instances, the design tool system selects local parameter values from left tail extreme instance 420 and right tail extreme instance 430 to propagate up to the sense amplifier level and perform second hierarchical level simulations shown in FIG. 5. FIG. 4 shows extreme instances corresponding to bitcells 1 and 128 only for simplicity purposes. Any of the bitcells may be deemed extreme instances based upon computation results.

Figure 5:
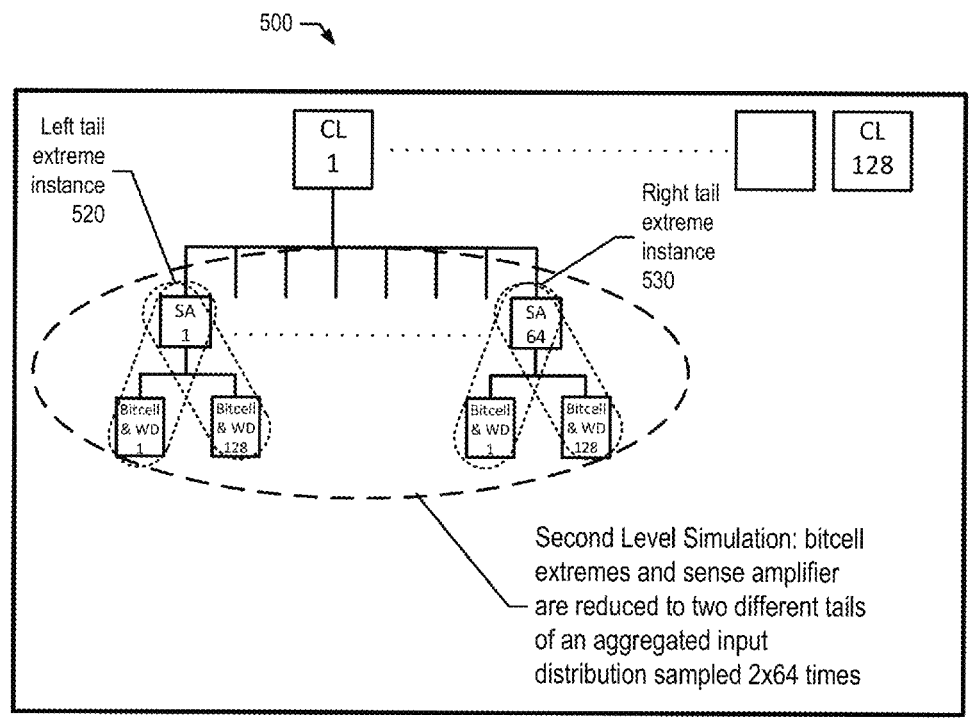
FIG. 5 is a diagram depicting a graphical example of the integrated circuit design simulation hierarchy simulating the sense amplifier level using the two sets of extreme instance local parameter values in the bitcell level depicted in FIG. 4.

FIG. 5 is a diagram depicting a graphical example of the integrated circuit design simulation hierarchy simulating the sense amplifier level using the two sets of extreme instance local parameter values in the bitcell level that were determined in FIG. 4. Diagram 500 shows that the sense amplifier level is simulated by varying the local parameter values of the sense amplifier and the two sets of extreme instance local parameter values aggregated up from the bitcell and word-line driver level.

The design tool then generates PDFs from the simulations and identifies extreme instances on the left tail and right tail of the distributions. In turn, the design tool determines bitcell local parameter values and sense amplifier local parameter values that correspond to left tail extreme instance 520 and right tail extreme instance 530.

Figure 6:
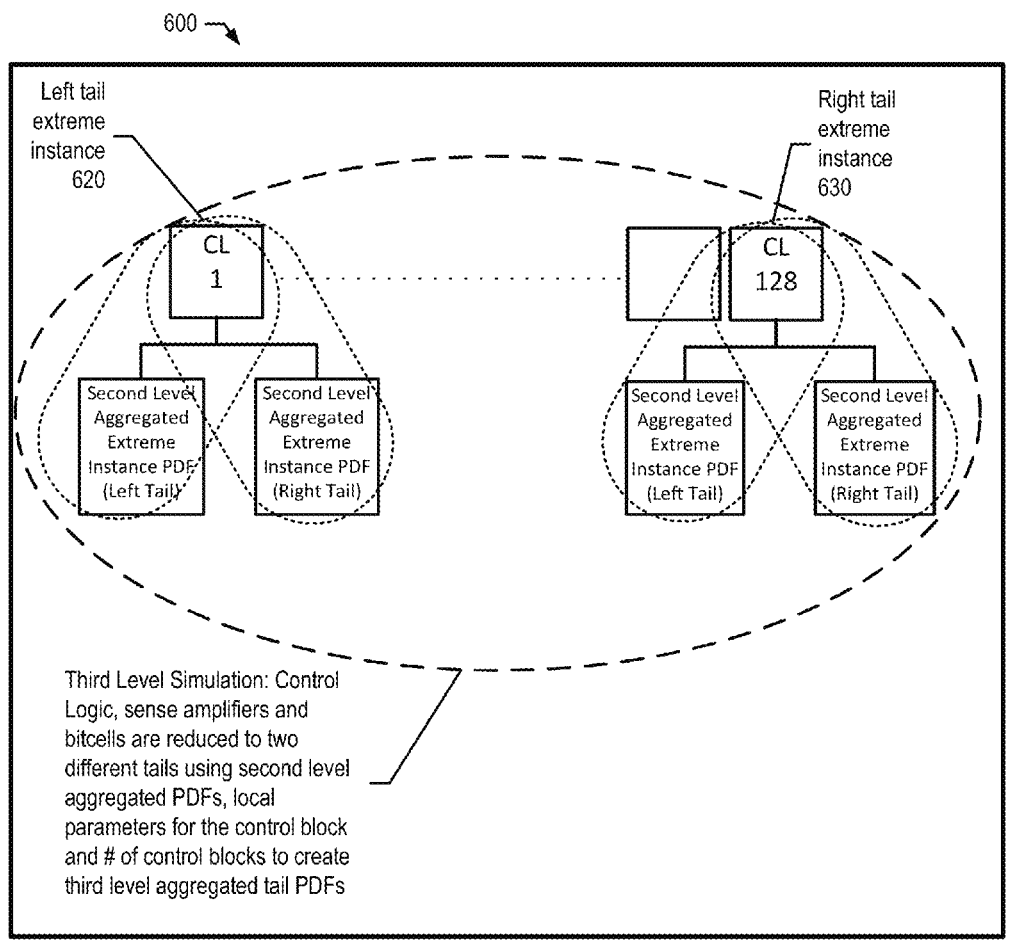
FIG. 6 is a diagram depicting a graphical example of the integrated circuit design hierarchy simulating the control logic level using extreme instance local parameter values from lower hierarchical levels depicted in FIG. 5.

FIG. 6 is a diagram depicting a graphical example of the integrated circuit design hierarchy simulating the control logic level using extreme instance local parameter values from lower hierarchical levels depicted in FIG. 5.

Diagram 600 shows that the control logic level is simulated by varying the local parameter values of the control logic and using the two sets of extreme instance local parameter values promoted up from simulations that varied local parameters at the sense amplifier level and below. The extreme instance local parameter values include local parameters for sense amplifiers and bitcells corresponding to both the left tail and the right tail of the generated extreme value PDFs.

The design tool generates PDFs from the simulations and identifies extreme instances on the left tail and right tail of the distributions. In turn, the design tool determines the bitcell local parameter values, the word-line driver local parameter values, the sense amplifier local parameter values, and the control logic local parameter values that correspond to left tail extreme instance 620 and right tail extreme instance 630.

FIG. 7 is a flowchart depicting one example of steps taken to generate an aggregated PDF and use the aggregated PDF to determine whether an integrated circuit design meets a yield requirement.

FIG. 7 processing commences at 700 whereupon, at 705, the process extracts the critical path through the integrated circuit design, which includes one instance from each hierarchical level, such as one bitcell instance, one word-line driver instance, one sense amplifier instance, and one control logic instance. At 710, the process defines a series of hierarchies such that a set of the elements of the critical path are duplicated in any given hierarchy. The process then selects the lowest level in the integrated circuit design hierarchy, such as the bitcell level in a memory array. At 715, the process sets "Ni" to the number of block instances in the selected hierarchy. For example, the bitcell level may include Ni=128 bitcell bock instances within the bitcell hierarchical level.

At 720, the process generates N samples, such as 1,000 samples, using local parameters of the first hierarchical level from process data 150, such as level 1 local parameters 155 shown in FIG. 1. As this is the process's first time through the loop, the process does not factor in input values of extreme outputs from lower hierarchical levels into the samples. However, the next time through the loop, such as when simulating at the sense amplifier levels, the process uses the original PDF of the local parameters of the second hierarchical level and the local parameters in the first hierarchical level corresponding to lower level extreme PDFs that are generated in 735 discussed below. The process varies the local parameters of all the elements in the lower level that have more 1 instance in the current hierarchy.

At 725, the process simulates the entire critical path N times using the generated samples and generates a critical path PDF based on the simulation output values. At 730, the process uses the critical path PDF for one block instance and the number of instances in the selected hierarchical level, such as 128 bitcell instances, to create a left side and a right side extreme value PDF for the selected hierarchical level.

At 740, the process determines the local parameter values corresponding to the output values that created the two extreme value PDFs, or aggregated extreme value PDFs the next time through the loop, and stores the local parameter values, referred to herein, as extreme instance local parameter values into temporary store 738.

The process determines at 740 as to whether the process reached the highest hierarchical level, such as the control logic level. If the process has not yet reached the highest hierarchical level, decision 740 branches to the "No" branch, whereupon the process loops back and selects the next higher level of hierarchy at 745. This looping continues until the process reaches the highest hierarchical level, at which point decision 740 branches to the "Yes" branch.

At 750, the process executes two sets of simulations for the critical path to generate distributions of hierarchically aggregated simulation results, also referred to as hierarchically aggregated extreme value PDFs. The first set of simulations uses global parameters 170 from process data 150 and left-side extreme instance local parameter values from temporary store 738, while the second set of simulations uses global parameters 170 and right-side extreme instance local parameter values from temporary store 738. As discussed above in 735, the left-side and right-side extreme instance local parameter values are the local parameter values from each hierarchical level that generated the output values of the left-side aggregated extreme value PDF and the right-side aggregated extreme value PDF, respectively. Each set of global parameters corresponds to one instance of the integrated circuit design. It therefore complies with the specification limits of output metrics on both extremes for the part to be considered yielding. For instance, static RAM access time should be no larger than 30 ns.

The process determines at 755 as to whether both sets of the simulation results meet the yield requirement for the output metric spec. For example, we can assess whether more than 99.9% of the parts (global parameter sample sets) have met the specifications (access time smaller than 30 ns). While the specification requirements may be one-sided, the specification requirements, on occasion, may be limiting from both the lower and upper ends. Designs may also be assessed for multiple specification requirements.

When the simulation results do not meet yield expectations for a specification requirement, decision 755 branches to the "Yes" branch, whereupon the process generates a notification that design modifications are required at 780, and FIG. 7 processing ends at 790. In one embodiment, a circuit designer may analyze the simulation results and determine required design changes, such as larger drivers are required in various places of the integrated circuit design to decrease delay. The circuit designer uses integrated circuit design system 180 to modify integrated circuit design 100 and, after modifications, the process re-commences at 700 to perform hierarchical level timing simulations as discussed above.

Referring back to decision 755, if both sets of the simulation results meet the yield requirement, decision 755 branches to the "Yes" branch whereupon the process proceeds to the next stage in the integrated circuit manufacturing flow, such has mask generation. FIG. 7 processing thereafter ends at 770.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Aspects of the present disclosure may be embodied as a system, method or computer program product. Accordingly, aspects of the present disclosure may take the form of an entirely hardware embodiment, a software embodiment (including firmware, resident software, micro-code, etc.), including processing circuitry for executing thereof, or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

FIG. 8 illustrates information handling system 800, which is a simplified example of a computer system capable of performing the computing operations described herein. Information handling system 800 includes one or more processors 810 coupled to processor interface bus 812. Processor interface bus 812 connects processors 810 to Northbridge 815, which is also known as the Memory Controller Hub (MCH). Northbridge 815 connects to system memory 820 and provides a means for processor(s) 810 to access the system memory. Graphics controller 825 also connects to Northbridge 815. In one embodiment, PCI Express bus 818 connects Northbridge 815 to graphics controller 825. Graphics controller 825 connects to display device 830, such as a computer monitor.

Northbridge 815 and Southbridge 835 connect to each other using bus 819. In one embodiment, the bus is a Direct Media Interface (DMI) bus that transfers data at high speeds in each direction between Northbridge 815 and Southbridge 835. In another embodiment, a Peripheral Component Interconnect (PCI) bus connects the Northbridge and the Southbridge. Southbridge 835, also known as the I/O Controller Hub (ICH) is a chip that generally implements capabilities that operate at slower speeds than the capabilities provided by the Northbridge. Southbridge 835 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 896 and "legacy" I/O devices (using a "super I/O" chip). The "legacy" I/O devices (898) can include, for example, serial and parallel ports, keyboard, mouse, and/or a floppy disk controller. The LPC bus also connects Southbridge 835 to Trusted Platform Module (TPM) 895. Other components often included in Southbridge 835 include a Direct Memory Access (DMA) controller, a Programmable Interrupt Controller (PIC), and a storage device controller, which connects Southbridge 835 to nonvolatile storage device 885, such as a hard disk drive, using bus 884.

ExpressCard 855 is a slot that connects hot-pluggable devices to the information handling system. ExpressCard 855 supports both PCI Express and USB connectivity as it connects to Southbridge 835 using both the Universal Serial Bus (USB) the PCI Express bus. Southbridge 835 includes USB Controller 840 that provides USB connectivity to devices that connect to the USB. These devices include webcam (camera) 850, infrared (IR) receiver 848, keyboard and trackpad 844, and Bluetooth device 846, which provides for wireless personal area networks (PANs). USB Controller 840 also provides USB connectivity to other miscellaneous USB connected devices 842, such as a mouse, removable nonvolatile storage device 845, modems, network cards, ISDN connectors, fax, printers, USB hubs, and many other types of USB connected devices. While removable nonvolatile storage device 845 is shown as a USB-connected device, removable nonvolatile storage device 845 could be connected using a different interface, such as a Firewire interface, etcetera.

Wireless Local Area Network (LAN) device 875 connects to Southbridge 835 via the PCI or PCI Express bus 872. LAN device 875 typically implements one of the IEEE 802.11 standards of over-the-air modulation techniques that all use the same protocol to wireless communicate between information handling system 800 and another computer system or device. Optical storage device 890 connects to Southbridge 835 using Serial ATA (SATA) bus 888. Serial ATA adapters and devices communicate over a high-speed serial link. The Serial ATA bus also connects Southbridge 835 to other forms of storage devices, such as hard disk drives. Audio circuitry 860, such as a sound card, connects to Southbridge 835 via bus 858. Audio circuitry 860 also provides functionality such as audio line-in and optical digital audio in port 862, optical digital output and headphone jack 864, internal speakers 866, and internal microphone 868. Ethernet controller 870 connects to Southbridge 835 using a bus, such as the PCI or PCI Express bus. Ethernet controller 870 connects information handling system 800 to a computer network, such as a Local Area Network (LAN), the Internet, and other public and private computer networks.

While FIG. 8 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method for simulating an integrated circuit design, the method comprising:
  iteratively performing, by a design tool, a plurality of simulation sets on an integrated circuit design, wherein each of the simulation sets corresponds to a different one of a plurality of hierarchical levels of the integrated circuit design with each of the simulation sets producing a different set of simulation results, and wherein each of the simulation sets utilizes a different set of local parameter values with one or more of the sets of local parameter values being extreme instance local parameter values that are based on the set of simulation results of the preceding simulation set;
  determining, by the design tool, a set of hierarchically aggregated simulation results based upon the set of simulation results that resulted from the last performed simulation set and further based upon one or more global parameters;

comparing the set of hierarchically aggregated simulation results to one or more specification requirements that correspond to the integrated circuit design;

modifying the integrated circuit design if the set of hierarchically aggregated simulation results fails to meet or exceed the specification requirements; and generating a semiconductor mask set using the integrated circuit design if the set of hierarchically aggregated simulation results meets or exceeds the specification requirements.

2. The method of claim 1 wherein the iterative performing of the simulation sets further comprises:

selecting a first one of the plurality of hierarchical levels;

performing a first one of the plurality of simulation sets using a first one of the different sets of local parameter values corresponding to the first hierarchical level, wherein the first simulation set produces a first one of the different sets of simulation results;

determining an amount of first instances in the first hierarchical level;

computing a first set of extreme value probability distribution functions based upon the first set of simulation results and the amount of first instances; and determining which of the first set of local parameter values produce one or more output values corresponding to the first set of extreme value probability distribution functions, wherein the determined first set of local parameter values are a first set of the extreme instance local parameter values.

3. The method of claim 2 further comprising:

selecting a second one of the plurality of hierarchical levels;

performing a second one of the plurality of simulation sets using the first set of extreme instance local parameter values and a second one of the different sets of local parameter values that correspond to the second hierarchical level, and wherein the second simulation set produces a second one of the different sets of simulation results;

determining an amount of second instances in the second hierarchical level;

computing a second set of extreme value probability distribution functions based upon the second set of simulation results and the amount of second instances; and determining which of the first set of extreme instance local parameter values and the second set of local parameter values produce one or more second output values corresponding to the second set of extreme value probability distribution functions, wherein the determined first set of extreme instance local parameter values and the determined second set of local parameter values are a second set of the extreme instance local parameter values.

4. The method of claim 3 further comprising:

selecting a third one of the plurality of hierarchical levels;

performing a third one of the plurality of simulation sets using the second set of extreme instance local parameter values and a third one of the different sets of local parameter values that correspond to the third hierarchical level, and wherein the third simulation set produces a third one of the different sets of simulation results;

determining an amount of third instances in the third hierarchical level;

computing a third set of extreme value probability distribution functions based upon the third set of simulation results and the amount of third instances;

determining which of the second set of extreme instance local parameter values and the third set of local parameter values produce one or more third output values corresponding to the third set of extreme value probability distribution functions, wherein the determined second set of extreme instance local parameter values and the determined third set of local parameter values are a third set of the extreme instance local parameter values; and using the third set of extreme instance local parameter values in the determining of the set of hierarchically aggregated simulation results.

5. The method of claim 4 wherein the integrated circuit design corresponds to a memory array, and wherein the first hierarchical level is a bit cell level, the second hierarchical level is a sense amplifier level, and the third hierarchical level is a control logic level.

6. The method of claim 5 wherein, prior to the performing of the first simulation set, the method further comprises:

determining a critical path of the integrated circuit design, wherein the critical path comprises one bitcell instance from the first hierarchical level, one sense amplifier instance from the second hierarchical level, and one control logic instance from the third hierarchical level; and defining the plurality of hierarchical levels of the integrated circuit design based upon the critical path.

7. The method of claim 2 wherein the first set of extreme value probability distribution functions comprise a left tail extreme value probability distribution function and a right tail extreme value probability distribution function.

8. The method of claim 1 wherein the modifying of the integrated circuit design is performed by an integrated circuit design system.

9. A system comprising:

one or more processors;

a memory accessible by the one or more processors;

a design tool system executed by at least one of the one or more processors and configured to:

iteratively performing a plurality of simulation sets on an integrated circuit design, wherein each of the simulation sets corresponds to a different one of a plurality of hierarchical levels of the integrated circuit design with each of the simulation sets producing a different set of simulation results, and wherein each of the simulation sets utilizes a different set of local parameter values with one or more of the sets of local parameter values being extreme instance local parameter values that are based on the set of simulation results of the preceding simulation set;

determine a set of hierarchically aggregated simulation results based upon the set of simulation results that resulted from the last performed simulation set and further based upon one or more global parameters;

compare the set of hierarchically aggregated simulation results to one or more specification requirements that correspond to the integrated circuit design;

modify the integrated circuit design if the set of hierarchically aggregated simulation results fails to meet or exceed the specification requirements; and generate a semiconductor mask set using the integrated circuit design if the set of hierarchically aggregated simulation results meets or exceeds the specification requirements.

10. The system of claim 9 wherein the design tool system is further configured to:
  select a first one of the plurality of hierarchical levels;
  perform a first one of the plurality of simulation sets using a first one of the different sets of local parameter values corresponding to the first hierarchical level, wherein the first simulation set produces a first one of the different sets of simulation results;
  determine an amount of first instances in the first hierarchical level;
  compute a first set of extreme value probability distribution functions based upon the first set of simulation results and the amount of first instances; and
  determine which of the first set of local parameter values produce one or more output values corresponding to the first set of extreme value probability distribution functions, wherein the determined first set of local parameter values are a first set of the extreme instance local parameter values.

11. The system of claim 10 wherein the design tool system is further configured to:
  select a second one of the plurality of hierarchical levels;
  perform a second one of the plurality of simulation sets using the first set of extreme instance local parameter values and a second one of the different sets of local parameter values that correspond to the second hierarchical level, and wherein the second simulation set produces a second one of the different sets of simulation results;
  determine an amount of second instances in the second hierarchical level;
  compute a second set of extreme value probability distribution functions based upon the second set of simulation results and the amount of second instances; and
  determine which of the first set of extreme instance local parameter values and the second set of local parameter values produce one or more second output values corresponding to the second set of extreme value probability distribution functions, wherein the determined first set of extreme instance local parameter values and the determined second set of local parameter values are a second set of the extreme instance local parameter values.

12. The system of claim 11 wherein the design tool system is further configured to:
  select a third one of the plurality of hierarchical levels;
  perform a third one of the plurality of simulation sets using the second set of extreme instance local parameter values and a third one of the different sets of local parameter values that correspond to the third hierarchical level, and wherein the third simulation set produces a third one of the different sets of simulation results;
  determine an amount of third instances in the third hierarchical level;
  compute a third set of extreme value probability distribution functions based upon the third set of simulation results and the amount of third instances;
  determine which of the second set of extreme instance local parameter values and the third set of local parameter values produce one or more third output values corresponding to the third set of extreme value probability distribution functions, wherein the determined second set of extreme instance local parameter values and the determined third set of local parameter values are a third set of the extreme instance local parameter values; and
  use the third set of extreme instance local parameter values to determine the set of hierarchically aggregated simulation results.

13. The system of claim 12 wherein the integrated circuit design corresponds to a memory array, and wherein the first hierarchical level is a bit cell level, the second hierarchical level is a sense amplifier level, and the third hierarchical level is a control logic level.

14. The system of claim 13 wherein, prior to the performing of the first simulation set, the design tool system is further configured to:
  determine a critical path of the integrated circuit design, wherein the critical path comprises one bitcell instance from the first hierarchical level, one sense amplifier instance from the second hierarchical level, and one control logic instance from the third hierarchical level; and
  define the plurality of hierarchical levels of the integrated circuit design based upon the critical path.

15. The system of claim 10 wherein the first set of extreme value probability distribution functions comprise a left tail extreme value probability distribution function and a right tail extreme value probability distribution function.

* * * * *